March 3, 1964 L. P. FRIEDER ETAL 3,123,102
HIGH TEMPERATURE RESISTANT TUBING
Filed July 6, 1959
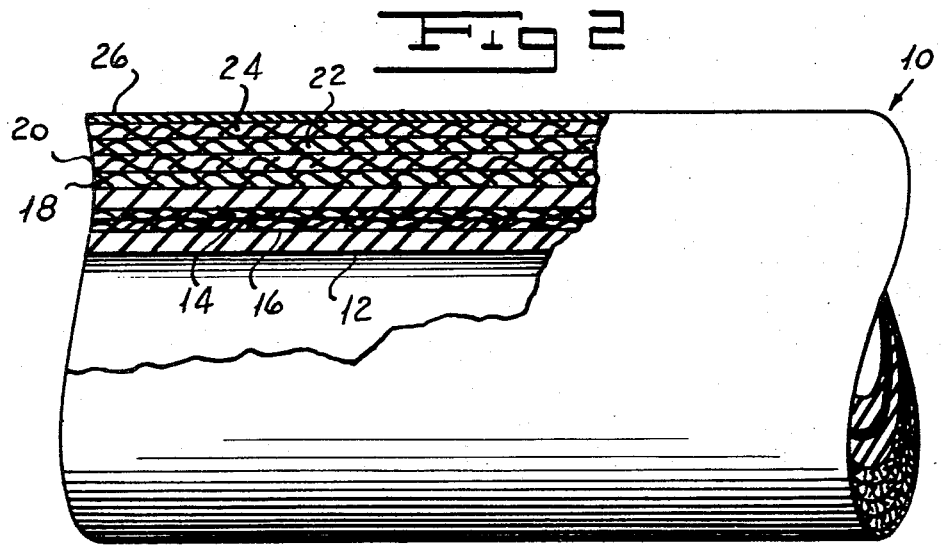
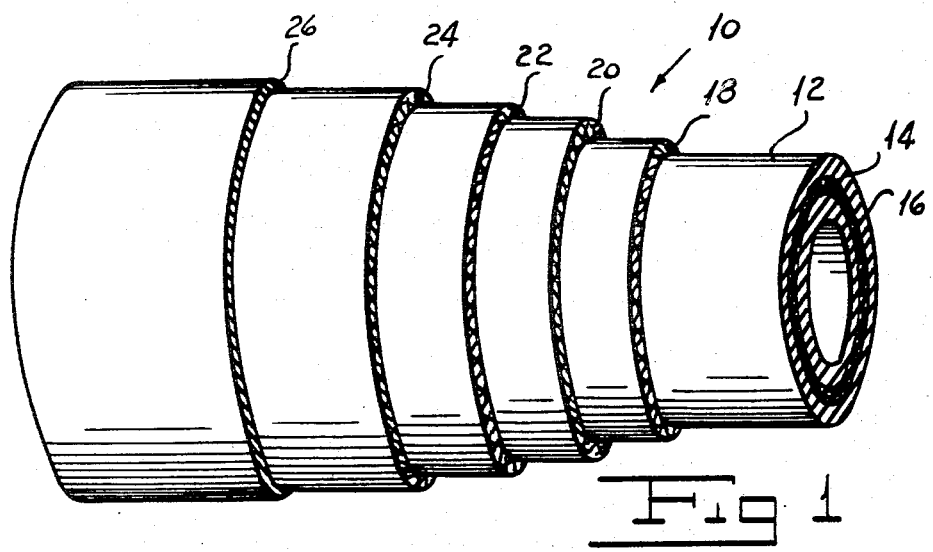
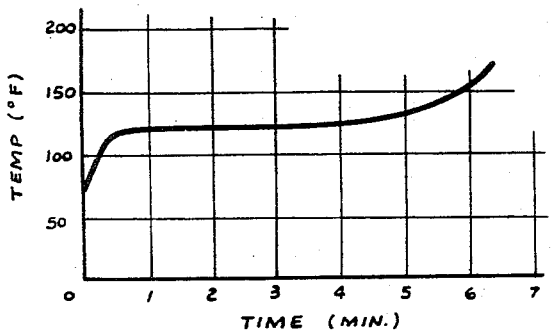
INVENTORS
LEONARD P. FRIEDER
JAN V. WEINBERGER
BY
ATTORNEY

United States Patent Office 3,123,102
Patented Mar. 3, 1964

3,123,102
HIGH TEMPERATURE RESISTANT TUBING
Leonard P. Frieder, Great Neck, N.Y., and Jan V. Weinberger, Ottawa, Ontario, Canada, assignors to Gentex Corporation, New York, N.Y., a corporation of Delaware
Filed July 6, 1959, Ser. No. 825,063
2 Claims. (Cl. 138—125)

Our invention relates to a high temperature resistant tubing and more particularly to a flame resistant hose for conveying combustible liquids or gases There are many instances in which hose is required to carry highly combustible fluids such for example as oil and gasoline and the like. For example, such tubing is required to carry high octane gasoline from the tank of an aircraft to the aircraft carburetors. Such tubing is also used to carry fuel at missile installations, in control lines of hydraulic systems for carrying fluid to hydraulic servo motors and in many other instances.

Hoses of the prior art employed in high pressure installations of the type described above generally are formed from fabric or wire-reinforced rubber or from fabric impregnated with a plastic. For lower pressure installations a material such for example as plastic tubing is employed. In the event of a fire at a location at which the tubing is installed such, for example, as may occur when an aircraft crashes, the tubing is subjected to extremely high temperatures. Hoses of the prior art formed from fabric or wire-reinforced rubber or from plastic impregnated fabric rapidly deteriorate under the action of these high temperatures and develop leaks permitting the highly combustible liquid carried by the tube to come into contact with the flame. This results not only in adding fuel to the fire but also it may produce an explosion or otherwise terminate the functional operation of the hose.

We have invented a flame and heat-resistant hose which is adapted to withstand extremely high temperatures over a period of time without developing leaks. Our tubing insulates the liquid being conveyed at a relatively low temperature when the tube is subjected to an extremely high temperature. Our tubing may readily be manufactured as a protective sleeve which can be applied to any type tubing known in the prior art. Our hose is especially adapted for use in installations in which highly inflammable or combustible liquid is to be conveyed.

One object of our invention is to provide a high temperature resistant tubing which withstands extremely high temperatures over a period of time without developing leaks.

A further object of our invention is to provide a flame resistant tubing which holds the temperature of the liquid to a relatively low value while the tubing is subjected to high temperatures.

Still another object of our invention is to provide a flame resistant hose which may be formed as a sleeve adapted to be applied to any form of tubing known to the prior art.

A still further object of our invention is to provide a flame resistant hose particularly adapted for use in installations at which combustible liquids are being carried.

Other and further objects of our invention will appear from the following description.

In general our invention contemplates the provision of a flame and heat-resistant hose including an interior insulating sleeve braided from a soft low twist yarn made up of a major portion of crimped natural fibers and of a minor portion of a suitable carrier. An intermediate heat-absorbing, braided sleeve of our tube is made up of yarns formed from a material such as a polymer of acrylonitrile which sublimates or decomposes to pass substantially directly from a solid to a gas on exposure to high heats together with a proportion of natural fibers which moderate the decomposing action of the acrylonitrile. The yarns of this intermediate sleeve incorporate a material such as acetate rayon filaments to prevent shrinkage of this intermediate sleeve. An outer braided insulating sleeve is formed from yarns made up of incombustible inorganic materials having a high degree of heat resistance with respect to the degree of heat resistance of the sublimating fibers. For example, the yarns may be made from asbestos fibers together with a proportion of metallic or glass fibers. Our tubing may be applied as a sleeve to any type of tubing known to the prior art. The outer insulating sleeve is coated or impregnated with rubber to protect it against damaging from abrasion.

FIGURE 1 is a perspective view of a length of our high temperature resistant tubing showing the various fabric layers.

FIGURE 2 is a perspective view of our high temperature resistant tubing with a part broken away to show the fabric layers in section.

FIGURE 3 is a graph illustrating the effect of the heat-resistant property of our high temperature resistant tubing in retarding the temperature increase of the gas or liquid contained therein.

Referring now more particularly to FIGURES 1 and 2 of the drawings, our high temperature resistant tubing indicated generally by the reference character 10 includes an inner hose 12 of conventional high pressure tubing which may for example be formed from rubber reinforced by respective fabric or wire layers 14 and 16. As will be apparent from the description of our tubing given hereinafter, the tube 12 may be any type of tube which is to be protected against the effects of high temperature. Our invention is particularly suited for use on a tube 12 which is to convey a highly combustible liquid or gases such as high octane gasoline or the like.

We provide the tube 12 with an inner insulating sleeve 18 which inhibits the transfer of heat through the sleeve to the hose 12. We form the sleeve 18 from yarns made up of organic fibers such as very fine wool fibers making up the major portion of the yarns of which the sleeve 18 is formed. As is explained hereinabove, the sleeve 18 is to provide an insulating sleeve which prevents the ready transfer of heat from the exterior of the sleeve 18 to the hose 12. As is known in the art, both the Angora wool and the fine sheep's wool fibers are naturally crimped with the result that they form air spaces or pockets which provide the desired insulation in the sleeve 18. If these natural fibers by themselves are twisted to form a soft yarn which has good insulating properties the yarn cannot be handled by a braiding machine without breaking. If the fibers are twisted tightly enough so that they can be handled their insulating property is lessened. To avoid this result and to form a yarn which can be braided, we incorporate with the fibers carrier fibers which may be fibers of nylon which is a synthetic, alcohol-soluble, orientable, long-chain, polymeric amide which has recurring amide groups as an integral part of the main polymer chain. The carrier may be formed by nylon fibers alone or by nylon fibers together with cellulose acetate rayon fibers. Preferably we incorporate a percentage of acetate fibers along with the nylon fibers to prevent any appreciable shrinking of the sleeve.

The fine wool fibers of the yarns of the sleeve 18 of our tubing are made up of a mixture of from about 45 percent to about 65 percent by weight of fine sheep's wool fibers with an optimum of about 50 percent by weight of sheep's wool and Angora wool in an amount of from 15 percent to 35 percent by weight with an optimum amount of about 25 percent by weight. The yarns of the sleeve 18 include cellulose acetate rayon fibers in an amount from zero to about 20 percent by weight with an optimum of 15 percent by weight. We incorporate nylon fibers in the yarn in an amount of from 5 to 15 percent by weight of the yarn, with an optimum of 10 percent by weight of the yarn. After having mixed the naturally crimped fibers and the synthetic fibers in amounts within the ranges set forth hereinabove, we twist the fibers into a soft low twist yarn which can be braided to form the sleeve 18.

Our high temperature resistant tubing includes a number of intermediate heat absorbing layers 20 and 22. We form each of the layers 20 and 22 from yarns made up of a major portion of a material which is adapted to sublimate or decompose to pass substantially directly from a solid to a gas together with a minor portion of a fiber which moderates the sublimation action. One material which may be employed as the decomposing fiber is a polymer of acrylonitrile such for example as Dynel which is the registered trademark of Union Carbide Corporation for a synthetic fiber formed by the copolymerization of 40 percent acrylonitrile and 60 percent vinyl chloride.

As has been pointed out hereinabove, one characteristic of the material such as Dynel which makes up the major portion of the yarns of the intermediate layers 20 and 22 is that of sublimation or of decomposing to pass directly from a solid state into a gaseous state. Upon the application of heat to Dynel, it continues to absorb heat until a temperature is reached at which it passes directly into the gaseous state. It will be appreciated that this decomposing action is highly endothermic. Another desirable characteristic of Dynel is that the gases formed as the material decomposes are halogen gases which are incombustible to produce a flame retarding effect. Where a yarn which consists entirely of Dynel fibers is subjected to high temperatures, the decomposing action takes place in a relatively short period of time. We incorporate in the yarns forming the sleeves 20 and 22 a portion of naturally crimped fibers which moderate the decomposing action. These fibers may, for example, be fine wool fibers which, owing to their scale-like configuration, provide air pockets which insulate the Dynel fibers from each other and thus inhibit the ready transfer of heat between the smooth Dynel fibers to extend the period of decomposing over that period normally required where the Dynel fibers are relatively solidly packed. In other words, by incorporating these natural fibers in the yarns of which the sleeves 20 and 22 are formed, the rate of heat absorption is reduced and the duration of the decomposing action is extended owing to the greater moisture content in the natural fibers and to the insulating effect of these fibers.

As is known in the art, materials such as Dynel, before decomposing, tend to shrink under the influence of heat. We inhibit this shrinking action by incorporating in the yarns of which the sleeves 20 and 22 are formed a minor amount of a material such as cellulose acetate rayon fiber which does not shrink appreciably under the action of heat and inhibits the shrinkage of the whole fabric.

Advantageously the yarns of which the sleeves 20 and 22 are formed include from about 55 percent by weight to about 70 percent by weight of acrylonitrile polymer fibers, from about 14 percent by weight to about 26 percent by weight of fine wool fibers, and from about 15 percent by weight to about 25 percent by weight of cellulose acetate rayon fibers. We have found that the use of Angora wool as the fine wool fibers produces excellent results in moderating the decomposing of the acrylonitrile. We have also discovered that a highly satisfactory moderation is produced if a mixture of the expensive Angora wool fibers with less expensive fine sheep's wool fibers is employed as the fine wool fiber component of the yarn. Preferably the Angora wool fibers should comprise at least fifty percent by weight of the fine wool fibers. As has been explained hereinabove, the fine wool fibers serve to moderate the decomposing of the acrylonitrile polymer fibers. The rayon fibers inhibit shrinkage of the sleeves 20 and 22 as the acrylonitrile polymer fibers shrink. We have discovered that if less than 55 percent by weight of acrylonitrile fibers are incorporated in the yarn of the sleeves 20 and 22, there is insufficient generation of gas and the desired heat absorption to be provided by the sleeves is lessened. If more than about 70 percent by weight of acrylonitrile fibers are used, then the moderating action of the fine wool fibers is reduced so that the desired stretching of the period over which decomposing of the acrylonitrile takes place is overly shortened.

Our high temperature resistant tube includes an outer sleeve 24 forming a mechanical flame barrier. We form this sleeve entirely from inorganic incombustible materials having a high degree of heat resistance with respect to the degree of heat resistance of the sublimating acrylonitrile fiber to provide the mechanical flame barrier. The major portion of the yarns from which the sleeve 24 is formed may for example be asbestos fibers. We incorporate in the yarn from 10 to 20 percent by weight of glass or metallic fibers, the particular percentage of glass or metallic fibers being determined by the length of the asbestos fibers. After these fibers have been combined and spun into yarn we braid the sleeve 24 on any suitable machine known to the art.

Preferably we provide the sleeve 24 with a coating 26 of rubber or rubber-like material to provide it with a smooth handling surface and to protect the asbestos fibers against the harmful effects of abrasion. If desired, the same result may be achieved by impregnating the outer sleeve 24 with rubber rather than coating the sleeve.

In operation of our flame resistant hose, upon the application of a flame or radiant heat to the hose the outer layer 24 which is formed of incombustible inorganic material provides a mechanical barrier against the flame. As the temperature of the heat absorbing layers or sleeves 20 and 22 rises, large amounts of heat are absorbed by the Dynel fibers until they reach the point at which they decompose to pass substantially directly from a solid to a gas. This action is moderated by the presence of the natural wool and Angora fibers which contain relatively large amounts of moisture as compared with the Dynel fibers and which serve to insulate the Dynel fibers from each other to prevent the ready transfer of heat throughout the Dynel fibers. Owing to the large amounts of heat absorbed by the Dynel during the decomposing process, large amounts of heat are prevented from reaching the inner tubing 12. The acetate fibers incorporated in the yarns from which the sleeves 20 and 22 are formed prevent shrinking of the sleeves, which tend to shrink away from the area of heat exposure and would distort the hose. The gases liberated as the Dynel decomposes are fire extinguishing gases which force air out of the air space in the natural fibers, thus depriving the area of oxygen and preventing the flame from reaching the inner sleeves. The gases thus generated carry heat out of the protective covering as they displace air in their flame extinguishing action. Even after these fibers have dissipated they leave insulating gas or air pockets between the nonflammable outer sleeve 24 providing the flame barrier and the inner insulating sleeve 18. The presence of halogen gases surrounding the acetate fibers allows for a process of dry distillation and prevents them from burning. The inner layer or sleeve 18 further insulates the tube 12 to inhibit transfer of heat to the tube 12. It is to be understood that while we have described our flame resistant tubing as being applied to a high pressure hose 12, we may form a braided protective sleeve including sleeves 18, 20, 22, and 24 separately and may apply it to any type of hose which is to be protected.

FIGURE 3 of the drawings graphically illustrates the action of our tubing in resisting high temperatures in the manner outlined above. In an actual test a length of fabric reinforced rubber tubing having an inner diameter of ½″ and a wall thickness of ¼″ was provided with sleeves 18, 20, 22, and 24 in the manner described hereinabove. One end of the length of tubing was closed and the tubing was filled with Mil–L–7808 oil at a pressure of approximately thirty pounds p.s.i. A thermocouple was inserted axially into the tube with its hot junction disposed adjacent the center of the length under test. A flame at a temperature of approximately 2000° F. ±50° F. was applied to the center of the length. As can be seen by reference to FIGURE 3, during the first thirty seconds of the test the temperature of the oil within the tube rose from room temperature to about 120° F. After five and one half minutes of application the oil within the tube rose only about 20°. After six minutes of application of the flame the tubing began to lose its heat resistant properties. Thus, not only was the hose itself protected against damage, but also the temperature of the oil within the tube was kept well below the danger point even after exposure of the tubing to an extremely high temperature over a relatively long period of time. It will be appreciated that if the oil is flowing through the tube, oil temperature within our flame resistant tubing would remain at a substantially lower level.

It will be seen that we have accomplished the objects of our invention. We have provided a high temperature resistant tubing which withstands very high temperature over a period of time without developing cracks or leaks. Our flame resistant hose maintains the temperature of fluid within the hose at a relatively low temperature as the hose is subjected to a high temperature flame or infra-red radiation over a period of time. Our tubing is formed as a sleeve which may readily be applied to any type of tube known to the art. Our hose is especially adapted for use in installations at which highly combustible liquid is to be conveyed.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a high temperature resistant tubing a protective covering including a sleeve formed from yarns comprising from 55 percent to 70 percent by weight of fibers of a polymer of acrylonitrile adapted under exposure to extreme heat to decompose by passing substantially directly from a solid to a gas from 14 percent to 26 percent by weight of wool fibers, and from 15 percent to 25 percent by weight of acetate rayon fibers to inhibit shrinkage of said sleeve.

2. In a high temperature resistant tubing a protective covering including a sleeve formed from yarns comprising from 55 percent to 70 percent by weight of fibers of a polymer of acrylonitrile adapted under exposure to extreme heat to decompose by passing substantially directly from a solid to a gas, from 14 percent to 26 percent by weight of a mixture of sheep's wool and Angora wool and from 15 percent to 25 percent by weight of acetate rayon fibers to inhibit shrinkage of said sleeve.

References Cited in the file of this patent
UNITED STATES PATENTS

| | | |
|---|---|---|
| 1,158,995 | Evans | Nov. 2, 1915 |
| 1,742,775 | Mallay | Jan. 7, 1930 |
| 2,114,274 | Huppert | Apr. 12, 1938 |
| 2,741,108 | Rogosin | Apr. 10, 1956 |
| 2,884,018 | Delcellier et al. | Apr. 28, 1959 |
| 2,899,982 | Harpfer | Aug. 18, 1959 |